United States Patent [19]
Gould et al.

[11] Patent Number: 6,003,534
[45] Date of Patent: Dec. 21, 1999

[54] ANHYDROUS AMMONIA DISTRIBUTOR

[75] Inventors: Neville Gould, Trangie; Pat Weldon, Dubbo, both of Australia

[73] Assignee: The Minister of Agriculture for the State of New South Wales, Australia

[21] Appl. No.: 08/799,394

[22] Filed: Feb. 11, 1997

[30] Foreign Application Priority Data

Feb. 12, 1996 [AU] Australia ................... PN8021

[51] Int. Cl.⁶ .................................................. A01C 23/00
[52] U.S. Cl. ...................... 137/1; 137/561 A; 137/565.27
[58] Field of Search ............................ 137/561 A, 262, 137/1, 565.27

[56] References Cited

U.S. PATENT DOCUMENTS

| | | | |
|---|---|---|---|
| 1,208,373 | 12/1916 | Rhodes | 137/262 |
| 3,423,913 | 1/1969 | Mecklin | 137/262 X |
| 3,631,825 | 1/1972 | Weiste | 111/11 |
| 4,530,452 | 7/1985 | Andersson | 239/7 |
| 4,549,567 | 10/1985 | Horton | 137/561 A |
| 5,271,567 | 12/1993 | Bauer | 137/561 A |
| 5,333,640 | 8/1994 | Swift et al. | 137/561 A |
| 5,444,879 | 8/1995 | Holtsnider | 137/561 A |

FOREIGN PATENT DOCUMENTS

| | | |
|---|---|---|
| 72772 | 2/1972 | Denmark . |
| 331606 | 1/1971 | Sweden . |

OTHER PUBLICATIONS

"Calibrating Anhydrous Ammonia Applicators," *Nebraska Cooperative Extension EC 94–737–D*, date unknown.

*Primary Examiner*—John Rivell
*Attorney, Agent, or Firm*—Rothwell, Figg, Ernst & Kurz

[57] ABSTRACT

This application concerns a distributor for agricultural chemicals, and in particular a manifold used in distributors of anhydrous ammonia. The manifold comprises a housing having an axially aligned inlet port and several radially arranged outlet ports. The outlet ports have equal angular separation around the periphery of the housing. A rotatable distributor is arranged within the housing, and a passage is provided through the rotatable distributor. The passage extends from an entry port communicating with the inlet port of the housing, to a delivery port which communicates with each outlet port in turn as the rotor rotates about the axis. The arrangement is such that, in use, the rotatable distributor has sufficient rotational momentum to enable it to behave like a flywheel, so that its rotational velocity remains substantially constant irrespective of the volumetric proportions of liquid to vapor at the entry port.

15 Claims, 4 Drawing Sheets

ANHYDROUS AMMONIA DISTRIBUTOR

TECHNICAL FIELD

This application concerns a distributor for agricultural chemicals, and in particular a manifold used in distributors of anyhdrous ammonia. Anhydrous ammonia, $HN_3$, contains 82% nitrogen, 18% hydrogen and less than 0.5% water by weight. Anhydrous ammonia is typically stored as a liquid under pressure and is delivered below the surface of the soil via tubes which are dragged through the soil.

BACKGROUND ART

The application of anhydrous ammonia to the soil is generally achieved by the use of tractor mounted equipment. A reservoir of anhydrous ammonia is mounted on the tractor, and a series of knives are pulled through the soil behind the tractor. Anhydrous ammonia travels from the reservoir, through a metering device, to a distribution manifold, and from there to tubes attached to the rear of the knives. As the knives are dragged through the soil behind the tractor the ammonia is directed out through holes in the tubes into the soil.

There are a number of different designs for the distribution manifold. They commonly have a cylindrical body with one axial inlet, and a number of radial outlets. In some designs a cone is provided inside the manifold immediately below the inlet to divert the incoming stream towards the radially arranged outlets.

There have been longstanding difficulties in calibrating anhydrous ammonia applicators and ensuring an even rate of delivery to the soil. An application distribution error rate of about 16% has in the past been found to be typical. To overcome this problem, operators often increase the application rate to ensure that all areas receive a full application. This may cause off-site pollution by nitrogen entering the ground water, and in addition is wasteful.

DISCLOSURE OF THE INVENTION

The inventors have discovered that during application, when the anhydrous ammonia is delivered from the holding tank to the metering device through a delivery hose, the anhydrous ammonia does not travel as a continuous liquid stream. Instead, the anhydrous ammonia arrives at the metering device as random slugs of liquid, vapour and a mixture of liquid-vapour occupying indeterminate volumes of the hose. After passing through the metering device, the flow stream increases in volume and velocity as more of the liquid turns to vapour (the vapour can occupy a volume 850 times greater than the same mass of liquid, although the exact ratio is temperature dependent). After having come to an understanding about this problem the inventors have made the present invention which, as currently envisaged, provides a manifold for the separation of an inlet stream of anhydrous ammonia into a plurality of outlets. The manifold comprises a housing having an axially aligned inlet port and several radially arranged outlet ports. The outlet ports have equal angular separation around the periphery of the housing. A rotatable distributor is arranged within the housing, and a passage is provided through the rotatable distributor. The passage extends from an entry port communicating with the inlet port of the housing, to a delivery port which communicates with each owlet port in turn as the rotor rotates about the axis. The arrangement is such that, in use, the rotatable distributor has sufficient rotational momentum to enable it to behave like a flywheel, so that its rotational velocity, although being dependent on the delivery rate, will remain substantially constant for any particular delivery irrespective of the volumetric proportions of liquid to vapour at the entry port. The result of this arrangement is to expose the delivery port of the rotatable distributor to each outlet port of the housing for substantially equally periods of time regardless of momentary fluctuations in the flow stream into the manifold.

The manifold allows for the even distribution of anhydrous ammonia along multiple conduits. The manifold will operate will liquid input, a mixed liquid-vapour input or a vapour input.

The desired operation is achieved by ensuring the rotatable distributor has sufficient mass and by the use of a sufficiently high rotational speed to enable it to behave as a flywheel. Speeds of operation between 600 and 2000 rpm have been tested with promising results. At present, speeds of between 900 and 1400 rpm are preferred.

The speed of rotation of the rotatable distributor may be governed in a variety of different ways. If the passage is shaped in a spiral configuration, then the flow of anhydrous ammonia through it will impart rotation due to the flow stream's impact on the walls of the passage. The speed of rotation in this case will be governed primarily by the pitch of the spiral and by the flow rate. Alternatively, the rotatable distributor may be driven, for instance by an electric motor. In any event, sensors may be provided within the rotatable distributor to allow measurement of the rotational velocity.

The passage need not be shaped in a spiral configuration. For instance, a straight passage having parallel or slightly tapered sidewalls may suffice. The flow stream will impact on the walls of the straight passage provided it is angled properly through the distributor.

The rotatable distributor may be constructed from a solid block of metal or plastics material, having the appropriate inertness to ammonia, and the ability to withstand the high pressures and low temperatures arising during operation. A single passage may be carved into the surface of the solid block, and this passage may have a constant cross-sectional area. A counter balancing blind passage may also be carved to improve the mass symmetry of the block and to ensure rotational balance. A cap may be secured to the top of the block, having an axial extension to provide an entry port. At the lower end of the entry port, a conical configuration may be provided to assist in diversion of the incoming stream of anhydrous ammonia from the axial direction to the radial. All bearings may be made from high density polyethylene.

In an alternative, the parts of the manifold may be cast or moulded, in which case the cap and block could be formed in one piece.

The rotatable distributor may be arranged to have a slightly smaller diameter than the inner dimension of the housing to create a delivery chamber between the delivery port of the rotatable distributor passage and the outlet ports in the wall of the housing. This chamber further equalises the delivery to each outlet port.

The cross-sectional area of the passage (taken perpendicular to the direction of the flow stream) may be sized slightly less than the total cross-sectional area of all the radial outlet ports from the housing. This allows the flow stream through the manifold to expand as it exits the delivery port of the passage and moves into the delivery chamber. The anhydrous ammonia then exits through the outlet ports arranged with equal angular separation around the chamber.

A straight axially aligned inlet conduit may be connected to the inlet port, and this has been found to be particularly effective in removing turbulence from the flow entering the manifold. The straight conduit should be between 0.1 and 1 metre in length, or more particularly between 30 and 70 cm. Alternatively a flow straightener or other flow conditioning device may be used.

A large distribution system may employ a primary manifold having two, three or four outlets, to split a stream of anhydrous ammonia from a holding tank into several streams. The several streams may be applied to the soil, or, they may be further split by secondary manifolds having multiple outlets before being applied to the soil.

BRIEF DESCRIPTION OF THE DRAWINGS

FIG. 3b is a vertical section on the lines of IIIb of FIG. 3a; and

The same reference numerals have been used throughout the drawings for corresponding features.

BEST MODES FOR CARRYING OUT THE INVENTION

Figure 1:
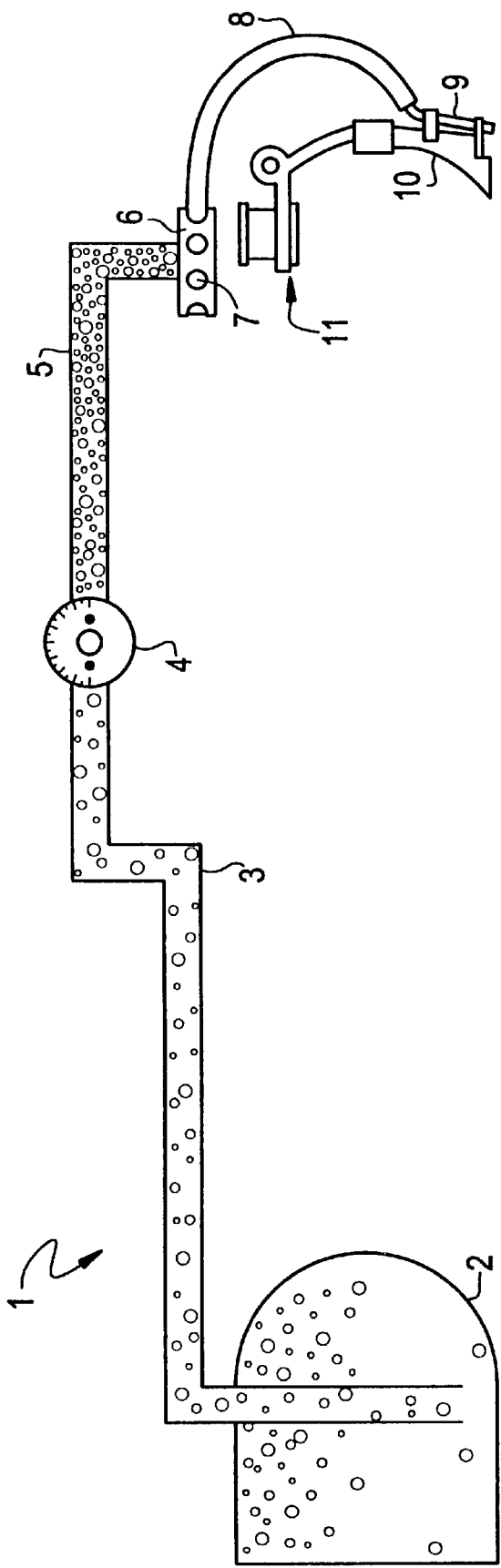
FIG. 1 is a schematic view showing the typical components of an anhydrous ammonia applicator.

Referring to FIG. 1, a typical anhydrous ammonia applicator 1 comprises a tractor mounted holding tank 2 having a capacity of between 500 to 1000 gallons of anhydrous ammonia kept under pressure of up to 300 psi. Anhydrous ammonia exits the tank 2 via a delivery hose 3 and is subjected to a pressure drop as it travels to a metering device 4. The pressure drop within delivery hose 3 allows appreciable changes to occur in the condition of the flow stream. These changes include increased vapour volume, due to partial vaporisation, and increased velocity, due to the increased volumetric flow rate.

The outflow of metering device 4 is then discharged into a conduit 5 before entering the delivery manifold 6. The delivery manifold 6 has a series of exits, one of which is indicated at 7, and each of these is connected by a further conduit, one of which is indicated at 8, to a respective delivery tube 9. Each delivery tube is attached to the back of the shank of a respective knife 10 mounted along a toolbar 11 towed behind the tractor. The pipeline fittings are generally made of steel rather than copper alloys such as brass, to prevent corrosion.

In use, the knives are dragged through the soil behind the tractor and the anhydrous ammonia is delivered beneath the level of the soil through holes in the delivery tubes 9. The volume of anhydrous ammonia applied is controlled, among other things, by the speed of travel of the tractor across the terrain.

Figure 2:
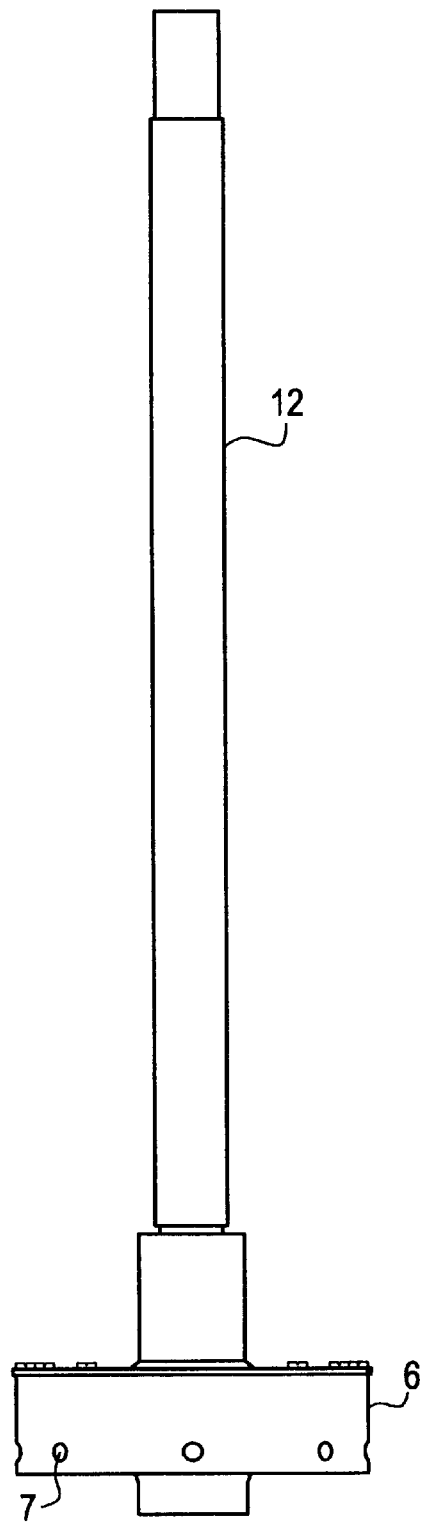
FIG. 2 is a pictorial view of a delivery manifold embodying the present invention.

The embodiment of the invention shown in FIG. 2 differs externally from the general arrangement shown in FIG. 1 by the inclusion of a straight conduit 12 which straightens the flow stream prior to entering the delivery manifold 6.

Figure 3A:
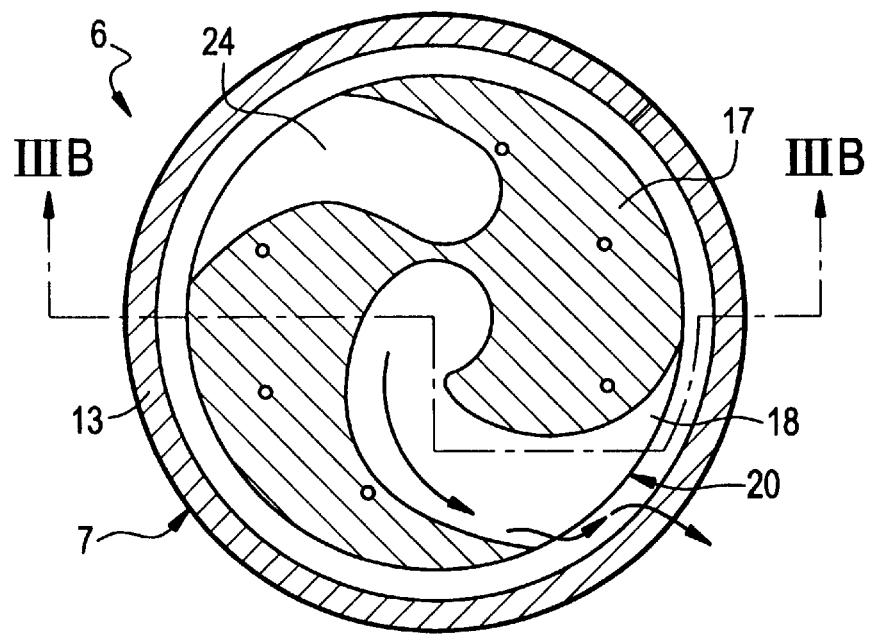
FIG. 3a is a horizontal section through the manifold of FIG. 2 along the lines IIIa of FIG. 3B.
Figure 3B:
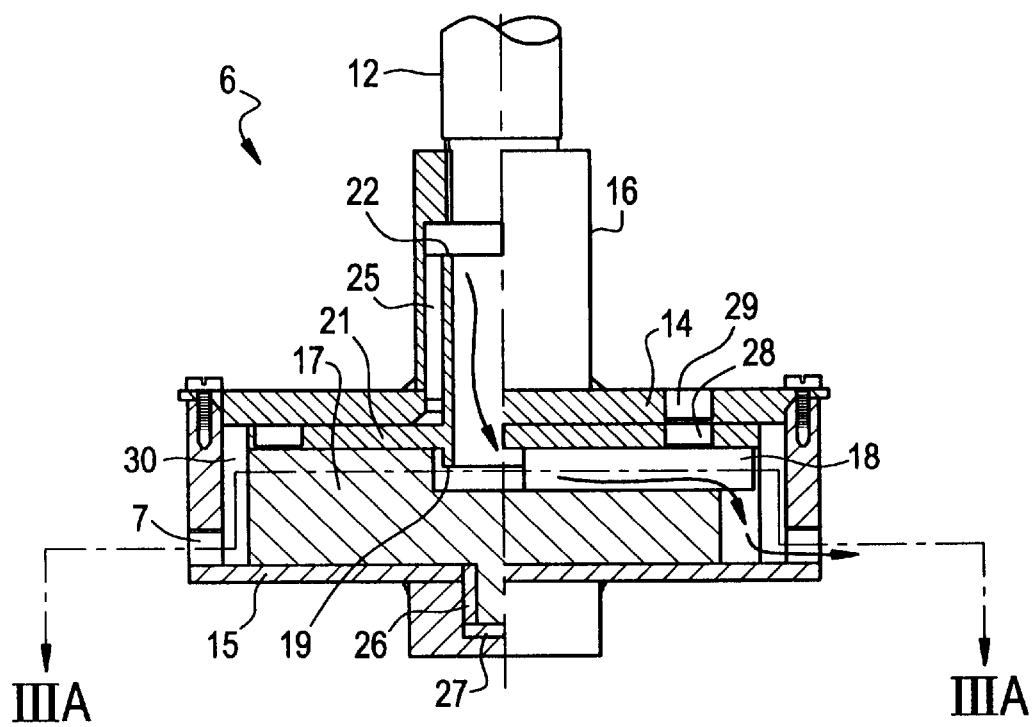

The delivery manifold will now be described in greater detail with reference to FIGS. 3a and 3b.

The delivery manifold comprises a housing comprising a side wall 13, a top 14 and a bottom 15. An inlet port 16 extends axially upwards from top 14 and connects with conduit 12. A rotor comprises a solid body 17 into which a single spiral shaped passage 18 is machined, to communicate from an axially aligned entry port 19 and a peripheral delivery port 20. A rotor cap 21 is connected to the top of rotor body 17 and has an upwardly directed axial formation 22 which defines the remainder of the entry port to the rotatable distributor.

A second blind, passageway 24 is also machined into rotor body 17 to provide symmetrical weight distribution as the rotor rotates. The rotor is rotatably mounted in the housing by means of a rotor cap bearing 25, a rotor shaft bearing 26 and a thrust bearing 27. Magnets 28 are installed in the rotor, and a hall effect device is installed in recess 29 in housing cover 14 to provide a rotational velocity sensor. The outer diameter of the rotor is slightly less than the inner diameter of the housing to create a delivery chamber 30 between the two.

In use, the anhydrous flow stream follows the path indicated by the arrows. First, it travels vertically down through conduit 12 and enters the extension 22 of rotor cap 12, and then is directed into passage 18. After being delivered through the passage to the delivery chamber 13, it makes its exit through exit ports 7. During the flow through passage 18, the rotor and cap are sent spinning due to the flow's impact on the walls of the passage 18.

The flow stream due to the rotation of the rotor is presented to each exit port 7 in turn. The mass of the rotor and the speed of its rotation, imparted by the flow, creates sufficient angular momentum for it not to be substantially affected by fluctuations in the composition of the flow stream. This near constant speed of the rotor exposes the delivery port 20 to each outlet port 7 for a substantially equal period of time. The speed of rotation is measured by the magnets 28 embedded in the rotor cap and the hall effect device 29 in the housing. Rotational speeds between 900 and 1400 rpm have been tested and found to operate satisfactorily. An alarm may be triggered in the event that the rotor fails to rotate.

The cross-sectional area of the passage 18 (perpendicular to the direction of the flow) is ideally, but not necessarily, slightly less than the total cross-sectional area of all the outlets 7. This allows the flow stream to expand as it exits the delivery port 20 of the passage and move into the delivery chamber 30 from where it exits through the peripheral outlet.

Figure 4:
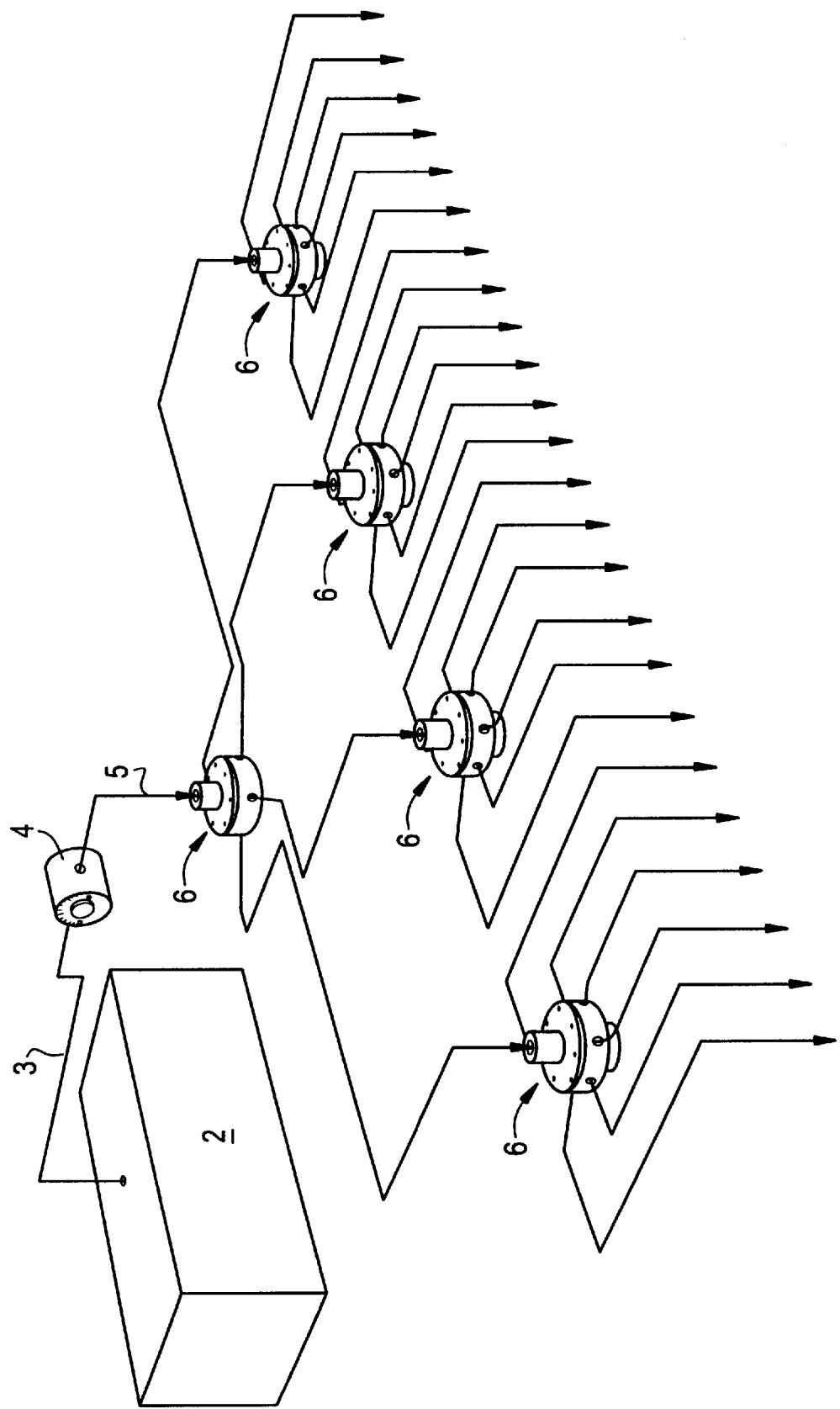
FIG. 4 shows an anhydrous ammonia distribution system employing a plurality of distribution manifolds according to the invention.

Although the invention has been described with reference to a single distributor manifold, it should be appreciated that a plurality of such manifolds may be connected together to form an overall distribution system, comprising for example a primary distributor and secondary distributors, where all of the distributors in the system are configured as described above. Such a distribution system is shown by way of example in FIG. 4. Moreover, it should be appreciated that the correlation between the rotational velocity, anhydrous ammonia temperature and pressure may also be measured in order to improve the constancy of the rate of flow of anhydrous ammonia into the soil. Many other type of rotational velocity sensor may also be used.

The bottom of the axial entry port 19 may be shaped to assist in redirecting the incoming anhydrous ammonia stream into the passage 18. In some embodiments a cone may also be employed to assist in this process.

It will be appreciated by persons skilled in the art that numerous variations and/or modifications may be made to the invention as shown in the specific embodiments without departing from the spirit of scope of the invention as broadly described. The present embodiments are, therefore, to be considered in all respects as illustrative and not restrictive.

We claim:

1. A manifold for the separation of an inlet stream of anhydrous ammonia into a plurality of outlets, comprising:
   a housing having an axially aligned inlet port and several radially arranged outlet ports formed in a cylindrical sidewall of said housing, said outlet ports having equal angular spacing around the periphery of the housing; and
   a rotatable distributor disposed within the housing, said rotatable distributor comprising a substantially solid body having a radially extending passage formed as a channel in the body of the rotatable distributor, the passage extending from an entry port communicating with the inlet port of the housing to a delivery port which communicates sequentially with each outlet port as the distributor rotates about its axis.

2. The manifold according to claim 1, wherein, in operation, the rotatable distributor spins at between 600 and 2000 revolutions per minute.

3. The manifold according to claim 1, wherein the passage is formed as a spiral or volute channel.

4. The manifold according to claim 1, wherein sensors are provided within the rotatable distributor to allow measurement of the rotational velocity.

5. The manifold according to claim 1, wherein said distributor has a single passage with a constant cross-sectional area extending from the entry port to the delivery port and a counter-balancing blind passage provided to improve the mass symmetry of the distributor and to ensure rotational balance.

6. The manifold according to claim 1, wherein the rotatable distributor has a slightly small diameter than an inner diameter of the cylindrical sidewall of the housing so as to form a delivery chamber between said delivery port and said outlet ports.

7. The manifold according to claim 1, wherein the cross-sectional area of the passage is slightly less than the total cross-sectional area of all the outlet ports.

8. The manifold according to claim 1, further comprising a straight, axially aligned inlet conduit connected to the inlet port.

9. The manifold according to claim 8, wherein the straight conduit is between 0.1 and 1 metre in length.

10. The manifold according to claim 9, wherein the straight conduit is between 0.3 and 0.7 metre in length.

11. A distribution system comprising a primary manifold to split a stream of anhydrous ammonia from a holding tank into several streams, which streams are further split by secondary manifolds before being applied to a soil region; wherein the primary and secondary manifolds are constructed according to claim 1.

12. A method of distributing anhydrous ammonia, comprising the steps of:
   passing said anhydrous ammonia radially through a radially extending channel formed within a solid-body, rotatable distributor, thereby causing said rotatable distributor to rotate;
   maintaining rotational velocity of said rotatable distributor so as to regulate passage of said anhydrous ammonia therethrough; and
   radially distributing said anhydrous ammonia to radially arranged, equi-angularly spaced outlet ports as said rotatable distributor rotates.

13. The method of distributing anhydrous ammonia according to claim 12, wherein said rotatable distributor is caused to attain sufficient rotational momentum to substantially prevent changes in mass flow distribution rate of said anhydrous ammonia due to changes in volume flow rate of said anhydrous ammonia to said rotatable distributor.

14. The method of distributing anhydrous ammonia according to claim 12, wherein an electric motor is used to turn said rotatable distributor at a predetermined speed so as to maintain the rotational velocity of said distributor.

15. A method of distributing multi-phase anhydrous ammonia comprising liquid anhydrous ammonia, gaseous anhydrous ammonia, by-phase anhydrous ammonia, and mixtures thereof, said method comprising the steps of:
   passing said multi-phase anhydrous ammonia through a solid-body rotatable distributor and causing said rotatable distributor to rotate with sufficient angular momentum to substantially prevent changes in the rotational velocity of said distributor due to changes in volume flow rate of said multi-phase anhydrous ammonia, and
   distributing said multi-phase anhydrous ammonia to radially arranged outlet ports by means of the rotation of said rotatable distributor,
   whereby changes in the mass flow rate of said multi-phase anhydrous ammonia to said outlet ports caused by changes in volume flow rate of said multi-phase anhydrous ammonia are substantially prevented.

* * * * *

UNITED STATES PATENT AND TRADEMARK OFFICE
CERTIFICATE OF CORRECTION

PATENT NO. : 6,003,534

DATED : December 21, 1999

INVENTOR(S) : Gould and Weldon

It is certified that error appears in the above-identified patent and that said Letters Patent are hereby corrected as shown below:

Column 1, line 7, "HN$_3$" should be --NH$_3$--.

Column 1, line 64, "owlet" should be --outlet--.

Column 2, line 2, "particular delivery" should be --particular delivery rate--.

Column 3, line 43, "outlow" should be --output--.

Column 4, line 9, "second blind" should be --second, blind--.

Column 5, claim 6, line 2, "small" should be --smaller--.

Column 6, claim 15, line 3, "by-phase" should be --bi-phase--.

Signed and Sealed this

Eighth Day of May, 2001

Attest:

NICHOLAS P. GODICI

Attesting Officer

Acting Director of the United States Patent and Trademark Office